United States Patent
Richardson (10) Patent No.: US 10,449,886 B2
(45) Date of Patent: Oct. 22, 2019

(54) CONTAINER TRANSFER SYSTEM

(71) Applicant: Revolutionary Truck Systems, Orange, CA (US)

(72) Inventor: Robert Richardson, Orange, CA (US)

(73) Assignee: Revolutionary Truck Systems, Orange, CA (US)

( * ) Notice: Subject to any disclaimer, the term of this patent is extended or adjusted under 35 U.S.C. 154(b) by 0 days.

(21) Appl. No.: 15/820,071

(22) Filed: Nov. 21, 2017

(65) Prior Publication Data

US 2018/0147969 A1    May 31, 2018

Related U.S. Application Data

(60) Provisional application No. 62/427,417, filed on Nov. 29, 2016.

(51) Int. Cl.
*B60P 1/38* (2006.01)
*B66F 3/24* (2006.01)
*B60P 1/64* (2006.01)

(52) U.S. Cl.
CPC ............... *B60P 1/38* (2013.01); *B66F 3/247* (2013.01); *B60P 1/6427* (2013.01)

(58) Field of Classification Search
CPC ................................. B60P 1/38; B60P 1/6427
See application file for complete search history.

(56) References Cited

U.S. PATENT DOCUMENTS

| 2,108,813 A | 2/1938 | Fitch |
|---|---|---|
| 2,126,800 A | 8/1938 | Norbom et al. |
| 2,127,058 A | 8/1938 | Fitch |
| 2,127,481 A | 8/1938 | Fitch |
| 2,127,482 A | 8/1938 | Fitch |
| 2,266,789 A | 12/1941 | Norbom |
| 2,266,790 A | 12/1941 | Norbom |
| 2,266,791 A | 12/1941 | Norbom |
| 2,282,352 A | 5/1942 | Fitch |
| 2,304,115 A | 12/1942 | Norbom |
| 2,304,117 A | 12/1942 | Norbom |
| 2,348,019 A | 5/1944 | Norbom |
| 3,206,053 A | 9/1965 | Bridge |
| 3,374,010 A | 3/1968 | Crockett et al. |
| 3,567,252 A | 3/1971 | Zubko |
| 3,612,315 A | 10/1971 | Blackburn |

(Continued)

FOREIGN PATENT DOCUMENTS

| GB | 544436 | 4/1942 |
|---|---|---|
| GB | 1474322 | 5/1977 |

(Continued)

OTHER PUBLICATIONS

International Search Report and Written Opinion for International Application No. PCT/US2017/063022 dated Mar. 8, 2018.

*Primary Examiner* — Kaitlin S Joerger (74) *Attorney, Agent, or Firm* — Knobbe Martens Olson & Bear LLP (57) ABSTRACT

A container transfer system is disclosed. The container transfer system includes a conveyance mechanism configured to support a container and move the container along a first axis, and a lift mechanism configured to raise and lower the conveyance mechanism.

14 Claims, 10 Drawing Sheets

(56) References Cited

U.S. PATENT DOCUMENTS

| | | | |
|---|---|---|---|
| RE30,404 E * | 9/1980 | Pereira | A01D 87/121 414/439 |
| 4,261,682 A * | 4/1981 | Papps | B60P 1/38 198/813 |
| 4,599,040 A | 7/1986 | Rasmussen | |
| 4,836,735 A | 6/1989 | Dennehy, Jr. et al. | |
| 4,909,378 A * | 3/1990 | Webb | B60P 1/38 198/721 |
| 5,169,194 A | 12/1992 | Yamashita et al. | |
| 5,193,968 A | 3/1993 | Hicks | |
| 5,203,670 A | 4/1993 | Yoneda et al. | |
| 5,395,201 A | 3/1995 | Yamashita et al. | |
| 5,467,827 A | 11/1995 | McLoughlin | |
| 5,605,427 A * | 2/1997 | Hammond | B65G 1/06 193/35 SS |
| 6,585,473 B2 * | 7/2003 | Turner | B65G 13/12 193/35 SS |
| 6,652,214 B1 | 11/2003 | Barry | |
| 6,695,561 B2 | 2/2004 | Barry | |
| 6,698,784 B2 | 3/2004 | Workman | |
| 6,935,829 B2 | 8/2005 | Smith et al. | |
| 6,962,473 B2 | 11/2005 | Scranton et al. | |
| 7,074,004 B2 | 7/2006 | Lockamy et al. | |
| 7,228,585 B1 | 6/2007 | Egland | |
| 7,241,100 B2 | 7/2007 | Lockamy et al. | |
| 7,264,437 B2 | 9/2007 | Lockamy et al. | |
| 7,270,511 B2 | 9/2007 | Lockamy et al. | |
| 7,438,515 B2 | 10/2008 | Barry | |
| 7,563,065 B1 | 7/2009 | Bennett | |
| 7,618,224 B2 | 11/2009 | Barry | |
| 8,157,499 B1 | 4/2012 | Jones | |
| 8,306,706 B2 | 11/2012 | Kim | |
| 8,414,245 B2 | 4/2013 | Johnson et al. | |
| 8,434,991 B1 | 5/2013 | Hacker | |
| 8,602,712 B2 | 12/2013 | Ritson | |
| 9,056,577 B2 * | 6/2015 | Corrigan | B60P 1/52 |
| 9,630,545 B1 * | 4/2017 | Corrigan | B60P 1/38 |
| 2005/0244256 A1 | 11/2005 | Barry | |
| 2007/0186361 A1 | 8/2007 | Egland | |
| 2013/0011230 A1 | 1/2013 | Barry | |
| 2013/0011299 A1 | 1/2013 | Barry | |
| 2016/0009506 A1 * | 1/2016 | Kelderman | A01D 90/08 414/528 |
| 2017/0225602 A1 * | 8/2017 | Corrigan | B60P 1/38 |

FOREIGN PATENT DOCUMENTS

| | | |
|---|---|---|
| KR | 20120039769 | 4/2012 |
| NL | 1031370 | 9/2007 |
| WO | WO 2014/203024 | 12/2014 |

* cited by examiner

CONTAINER TRANSFER SYSTEM

INCORPORATION BY REFERENCE TO ANY PRIORITY APPLICATIONS

This application claims priority to U.S. Provisional Patent Application No. 62/427,417, filed Nov. 29, 2016, and which is incorporated herein by reference. Any and all applications for which a foreign or domestic priority claim is identified in the Application Data Sheet as filed with the present application are hereby incorporated by reference under 37 CFR 1.57.

BACKGROUND

Field

This disclosure relates to cargo transport, and, in particular, to systems for transferring containers between transport vehicles.

Description of the Related Art

Traditionally, cargo is transported by one or more vehicles from an origin location to a destination. In some instances, the cargo is loaded on pallets, which are placed into a first transport vehicle by a forklift. In some instances, pallets are not used, and the cargo is loaded directly onto the floor ("floor loaded") of the first transport vehicle.

During transportation, the cargo can be transferred from the first transport vehicle to one or more subsequent transport vehicles. In long haul transfer, the cargo can be transferred, for example, from a train to a truck. As another example, in hub and spoke distribution, cargo can be delivered to a distribution center by a first truck and then divided into one or more second trucks (for example, cross-docked) for delivery to one or more destinations. If the cargo is loaded on pallets, forklifts can facilitate the transfer between transport vehicles. If the cargo is floor loaded, the transfer can be accomplished by manual unloading and loading of cargo. These transfer methods can require additional equipment (such as forklifts) and/or manpower. Additionally, during transfer between transport vehicles, the cargo is exposed to tampering, damage, or loss.

SUMMARY

In a first aspect, a container transfer system is disclosed. The container transfer system includes a conveyance mechanism configured to support a container and move the container along a first axis, and a lift mechanism configured to raise and lower the conveyance mechanism.

In some embodiments, the conveyance mechanism includes a drive tray including a channel, a plurality of sockets mounted to the drive tray and positioned within the channel, a conveyor chain mounted on the plurality of sockets, and/or an electric motor connected to one of the plurality of sockets and configured to drive the conveyor chain. In some embodiments, the lift mechanism includes a frame, and an air spring attached at a first end to the frame and at a second end to the drive tray, wherein a height of the air spring can be adjusted to vary a distance between the frame and the conveyance mechanism. In some embodiments, the lift mechanism further comprises a telescoping strut attached at a first end to the frame, and a stabilizer slide attached to a second end of the telescoping strut, the stabilizer slide including a channel, wherein the drive tray is received within the channel of the stabilizer slide. In some embodiments, a glide pad is positioned within the channel of the stabilizer slide between the stabilizer slide and the drive tray. In some embodiments, the drive tray is configured to slide along the channel of the stabilizer slide. In some embodiments, the lift mechanism further includes a stabilizer bar extending between the second end of the air spring and the second end of the telescoping strut. In some embodiments, the stabilizer bar is configured to telescope such that a length of the stabilizer bar is adjustable. In some embodiments, the frame is configured to mount to a vehicle. In some embodiments, the lift mechanism is a first lift mechanism attached to a first end of the conveyance mechanism and a second lift mechanism is attached to a second end of the conveyance mechanism. In some embodiments, each of the first and second lift mechanisms is independently adjustable such that an angle of the conveyance mechanism can be adjusted. In some embodiments, the container includes an engagement structure for engaging the conveyance mechanism.

In another aspect, a vehicle comprising one or more of the container transfer systems as described above and throughout this application is disclosed. In some embodiments, the container transfer system is the container transfer system according to the first aspect.

In another aspect, a method for transferring a container between a first vehicle and a second vehicle or the first vehicle and a rack is disclosed. The method includes longitudinally aligning a conveyance mechanism of a container transfer system of the first vehicle with a conveyance mechanism of a container transfer system of the second vehicle or the rack; vertically aligning the conveyance mechanism of the container transfer system of the first vehicle with the conveyance mechanism of the container transfer system of the second vehicle or the rack by adjusting a lift mechanism of the container transfer system of the first vehicle and/or a lift mechanism of the container transfer system of the second vehicle or the rack; and transferring a container from the container transfer system of the first transfer vehicle to the container transfer system of the second transfer vehicle with the conveyance mechanism of the container transfer system of the first transfer vehicle and/or the container transfer system of the second transfer vehicle or the rack.

In some embodiments, said longitudinally aligning comprises backing the first vehicle to the second vehicle or the rack such that the conveyance mechanisms are aligned. In some embodiments, said vertically aligning comprises adjusting a height of an air spring of the lift mechanism of the container transfer system of the first and/or second vehicle or rack. In some embodiments, said transferring comprises driving a conveyor chain of the conveyance mechanism of the first and/or second vehicle or rack. In some embodiments, the container transfer system of the first vehicle and the container transfer system of the second vehicle or rack comprise the container transfer system according to the first aspect or as described elsewhere throughout this application.

BRIEF DESCRIPTION OF THE DRAWINGS

These drawings depict only several embodiments in accordance with the disclosure and are not to be considered limiting of its scope. In the drawings, similar reference numbers or symbols typically identify similar components, unless context dictates otherwise. The drawings may not be to scale.

DETAILED DESCRIPTION

Disclosed herein are container transfer systems and related methods. In some embodiments, the container transfer systems are installed directly on transport vehicles and/or racks and are configured to transfer cargo-loaded containers (or unloaded containers) directly between transport vehicles and/or racks. In some embodiments, the container transfer systems are configured to transfer containers without requiring the use of additional equipment (such as forklifts, cranes, hoists, etc.) and/or dedicated facilities (such as docks, facilities, etc.). In some embodiments, the containers transfer systems transfer containers in a substantially horizontally direction. In some embodiments, because the container transfer systems transfer containers directly between transport vehicles, cargo does not need to be unloaded and reloaded. In some embodiments, this simplifies cargo transfer between vehicles and/or eliminates or mitigates tampering, damage, or loss of the cargo.

These and other features and advantages of the container transfer systems described herein will become more fully apparent from the following description and appended claims, taken in conjunction with the accompanying drawings. Although the drawings illustrate several specific embodiments, these are provided by way of example only and are not intended to be limiting. The features of any of the embodiments illustrated in drawings or described in text throughout this application can be modified, duplicated, removed, and/or combined with features of any other embodiment illustrated or described herein, or as will be apparent to a person of ordinary skill in the art upon consideration of this disclosure.

Figure 1:
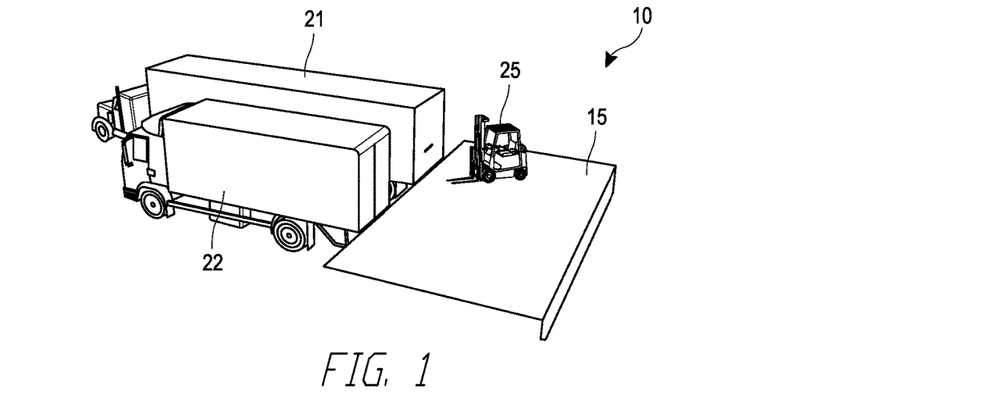
FIG. 1 is a perspective view of an embodiment of a conventional cross-docking site.

FIG. 1 is a perspective view of an embodiment of a cross-docking site 10. The cross-docking site 10 is a location where cargo can be transferred between transport vehicles. In FIG. 1, a first transport vehicle 21 and a second transport vehicle 22 are present at the cross-docking site. As illustrated, the first transport vehicle 21 is a larger semi-truck and the second transport vehicle 22 is a smaller delivery truck. However, the cross-docking site 10 can be used to transfer cargo between many different numbers and types of transport vehicles.

The cross-docking site 10 includes an elevated platform 15. To facilitate cargo transfer, the first and second transport vehicles 21, 22 are backed to the elevated platform 15 such that doors into the cargo area of each are level with the elevated platform 15. In general, the cargo area of each transport vehicle 21, 22 is an enclosed storage space permanently affixed to the transport vehicle itself or a trailer pulled by the transport vehicle. In some instances, the cargo area may be open, such as a flatbed truck or trailer, for example. In some embodiments, a forklift 25 (or other similar device) located on the elevated platform 15 can then transfer pallets loaded with cargo between the first and second transport vehicles 21, 22. If the cargo is floor loaded into the transport vehicles 21, 22, dock workers may transfer the cargo manually.

Figure 2:
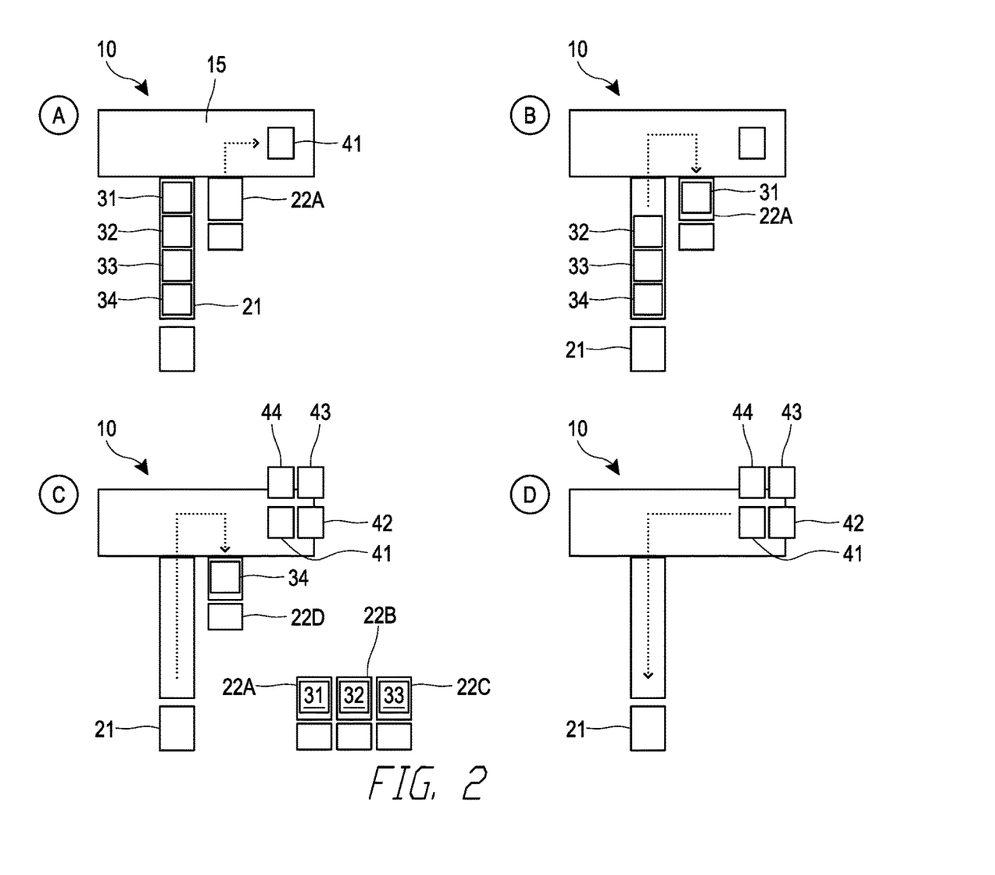
FIG. 2 is a diagram illustrating a simplified embodiment of a conventional cross-docking process.

FIG. 2 is a diagram illustrating a simplified embodiment of a conventional cross-docking process, performed, for example, at cross-docking site 10. In the illustrated embodiment, the process transfers cargo between the first transport vehicle 21 and four second transport vehicles 22a-22d (collectively, transport vehicles 22), although various modifications of the process are possible.

In panel A, the first transport vehicle 21 is backed to the elevated platform 15. The first transport vehicle 21 has been previously loaded with four unit loads 31-34. For ease of description, each unit load 31-34 will be described as including a single pallet loaded with cargo, although, it will be understood that each unit load 31-34 may comprise multiple pallets of cargo, quantities of floor loaded cargo, or cargo loaded into one or more other types of shipping containers. The second transport vehicle 22a is also backed to the elevated platform 15. In the illustrated embodiment, the second transport vehicle 22a is a delivery truck returned from a delivery and is loaded with an empty pallet. The empty pallet 41 can be unloaded from the second transport vehicle 22a by the forklift 25 and stored on the elevated platform 15.

In panel B, the first unit load 31 is transferred to the second transport vehicle 22a, for example, by the forklift 25. Transfer of the first unit load 31 includes removing the first unit load 31 from the first transport vehicle 21 and placing the first unit load in the second transport vehicle 22a. In some instances, transfer of the first unit load 31 can also include storage of the first unit load 31 on the elevated platform 15 or nearby for a period of time.

In panel C, the remaining unit loads 32-34 are transferred to additional second transport vehicles 22b-22d. Empty pallets 42-44 are shown, which have been unloaded from the second transport vehicles 22b-22d. Once loaded, second transport vehicles 22a-22d depart to deliver unit loads 31-34 to their respective destinations. In panel D, empty pallets 41-44 are loaded into the first transport vehicle 21 for return to a distribution center where they can be reloaded with cargo.

The cross-docking site 10 and process described with reference to FIGS. 1 and 2 can present several disadvantages. For one, because the cargo must be removed from the first transport vehicle 21 in order to be transferred to the second transport vehicles 22, it is exposed to tampering, damage, and loss. In some instances, the first and second vehicles 21, 22 are not present at the cross-docking site 10 at the same time. In these instances, cargo may be unloaded from the first transport vehicle 21 and stored on the elevated platform 15 (or elsewhere nearby) until the second transport vehicle 22 arrives and can be loaded. Storage of cargo at the cross-docking site 10 increases the exposure of the cargo to tampering, damage, and loss. Additionally, operation of the cross-docking site 10 can be expensive. For instance, the cross-docking site 10 requires a dedicated property, which can be expensive. Further, operation of the cross-docking site 10 can require expensive machinery, such as forklifts 15, and manpower. Finally, loading and unloading of cargo can take significant time, which can increase cost and decrease shipping speed. Container transfer systems and methods will now be described with reference to FIGS. 3-9, which can, in some embodiments, mitigate or resolve one or more of the above-noted disadvantages.

Figure 3:
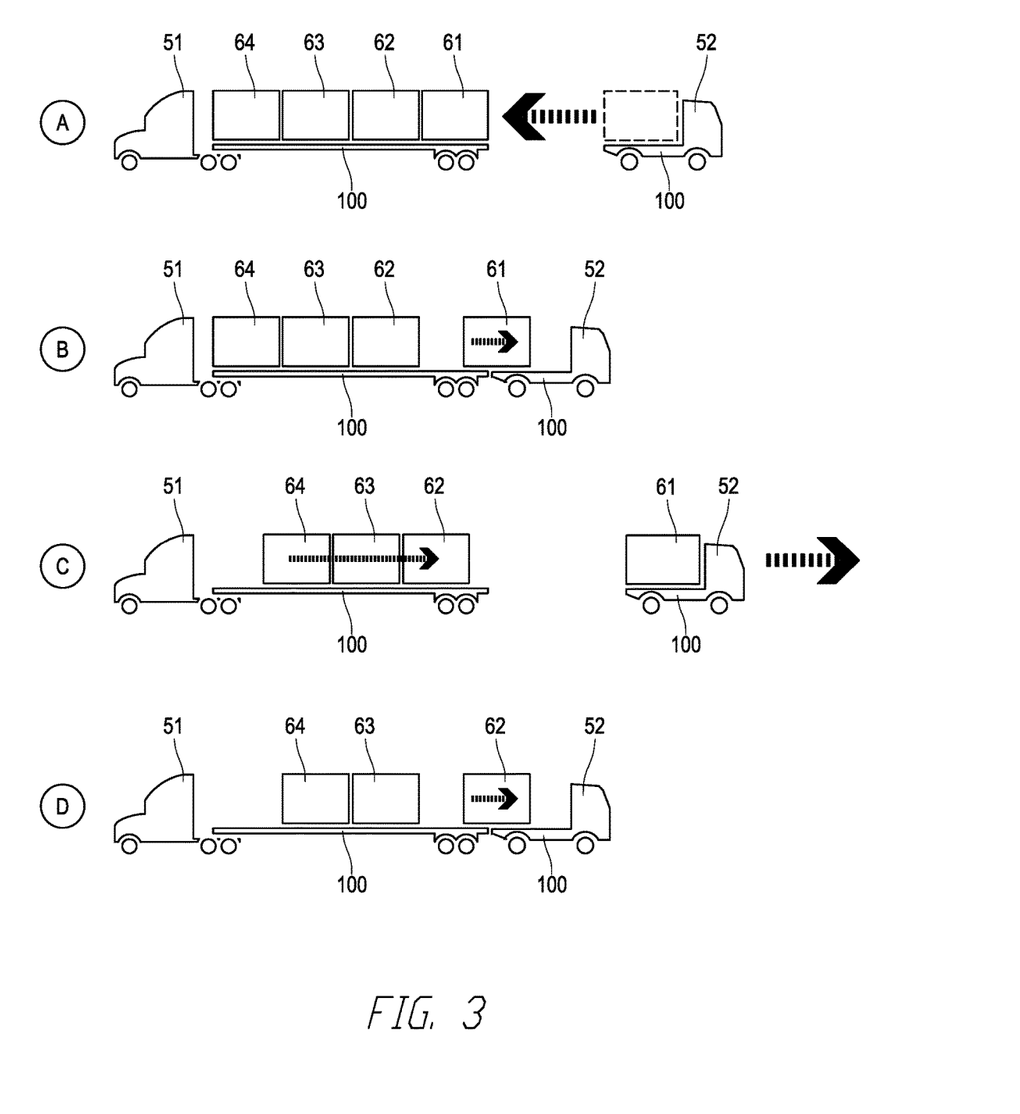
FIG. 3 is a diagram illustrating a simplified view of an embodiment of container transfer between transport vehicles using the container transfer systems described herein.

FIG. 3 is a diagram illustrating a simplified view of an embodiment of container transfer between transport vehicles 51, 52 using the container transfer systems 100 described herein. While not shown in detail in FIG. 3, an embodiment of the container transfer system 100 is shown in FIGS. 4A-4E below.

As shown in panel A of FIG. 3, a first transport vehicle 51 is loaded with four containers 61-64. Each container 61-64 can hold cargo. In some embodiments, the containers 61-64 can be fully enclosed and secured. The containers 61-64 are not permanently attached to the first transport vehicle 51, but rather are supported on a container transfer system 100 of the first transport vehicle 51. A second transport vehicle 52 is also illustrated. The second transport vehicle 52 also includes a container transfer system 100. As illustrated in panel A, the container transfer system 100 of the second transport vehicle 52 is empty (that is, no container is supported on the container transfer system 100, as illustrated by the dashed box). To transfer a container 61 from the first transport vehicle 51 to the second transport vehicle 52, the first and second transport vehicles 51, 52 are backed together, such that the container transfer systems 100 are aligned. In some embodiments, the container transfer systems 100 include features to level and align the two systems. In some embodiments, the first and second vehicles 51, 52 can be backed together in any location, as long as the location allows sufficient space for the maneuvering of the first and second transport vehicles 51, 52. Thus, in some embodiments, transfer of cargo is not limited to occurring only at cross-docking sites and does not require a dedicated cross-docking property.

As illustrated in panel B, the container transfer systems 100 are activated to transfer the container 61 from the first transport vehicle 51 to the second transport vehicle 52. As illustrated, in some embodiments, the transfer of container 61 proceeds in a substantially horizontal direction. In some embodiments, the transfer does not require external machinery, such as forklifts, cranes, hoists, etc. Further, in some embodiments, the container 61 remains closed during transfer, and thus, the cargo is not exposed to tampering, damage, or loss.

Once loaded with container 61, the second transport vehicle 52 can depart to deliver its cargo to its destination, as shown in panel C. As shown in panel D, an additional second transport vehicle 52 can be backed to the first transport vehicle 51 to receive transfer of container 62. This process can be repeated until all of containers 61-64 are transferred.

The transfer process illustrated in FIG. 3 is provides one example, among many, that illustrates the use of the container transfer systems 100 described herein. Numerous modifications of the process are possible. For example, the number of containers each transport vehicle can be configured to hold can be varied. In some embodiments, each transport vehicle can hold one, two, three, four, five, six, or more containers. As another example, the number of containers transferred between each transport vehicle can be varied. While FIG. 1 illustrates transfer of a single container at a time, in some embodiments, one, two, three, four, five, six, or more containers can be transferred together. As yet another example, in some embodiments, the container transfer systems 100 can be installed on other types of transport vehicles. For example, a container transfer system 100 can be installed on a rail car, a trailer, or in the cargo hold of an airplane or ship, among others. As yet another example, in some embodiments, the container transfer systems 100 can be installed on a holding rack, such that a container can be transferred from a transport vehicle to the holding rack and again from the holding rack to a transport vehicle. In the illustrated embodiment, containers are transferred from end to end. In some embodiments, however, containers can be transferred from side to side.

The container transfer systems 100 described herein can be used with many types and sizes of containers. The size, shape, and capacity of the containers can vary without limit and may depend upon the types of items to be transferred. In some instances, this may be cargo containers. In other instances, this may be different types of platforms (e.g., pallets, truck beds, etc.). For example, a single commercial truck may use the container transfer system 100 to shift between being a flatbed truck, to a dump truck, to a cement mixer, etc. As another example, in the case of agricultural equipment, one truck may be used for a variety of implements and accessories. In some embodiments, the cargo containers may be configured to comply with federal size constraints (for example, maximum lengths and widths for use on public roads). In some embodiments, the containers can be fully enclosed. In some embodiments, the containers can be securable (for example, lockable). In some embodiments, the containers can be open, for example, comprising open tops, ends, or sides.

In some embodiments, the container transfer systems 100 described herein provide one or more advantages. For example, in some embodiments, the container transfer systems 100: allow direct transfer of containers of cargo between transport vehicles, allow transfer of cargo at any location, do not require additional equipment or manpower to transfer containers, and/or do not expose (or reduce exposure of) the cargo to tampering, damage, or loss. In some embodiments, the container transfer systems 100 are fully operable by a single person, such as the driver. In some embodiments, the container transfer systems are controllable from within the cab of the transport vehicle. The container transfer system can include a controller allowing a user to manipulate the container transfer system 100, for example, to manually control the height and angle of the system as well as to drive the chain drives. In some embodiments, the system may be automated, and may include laser and proximity sensors that provide inputs to a computerized control system. A detailed embodiment of a container transfer system 100 will now be described with reference to FIGS. 4A-4E.

Figure 4A:
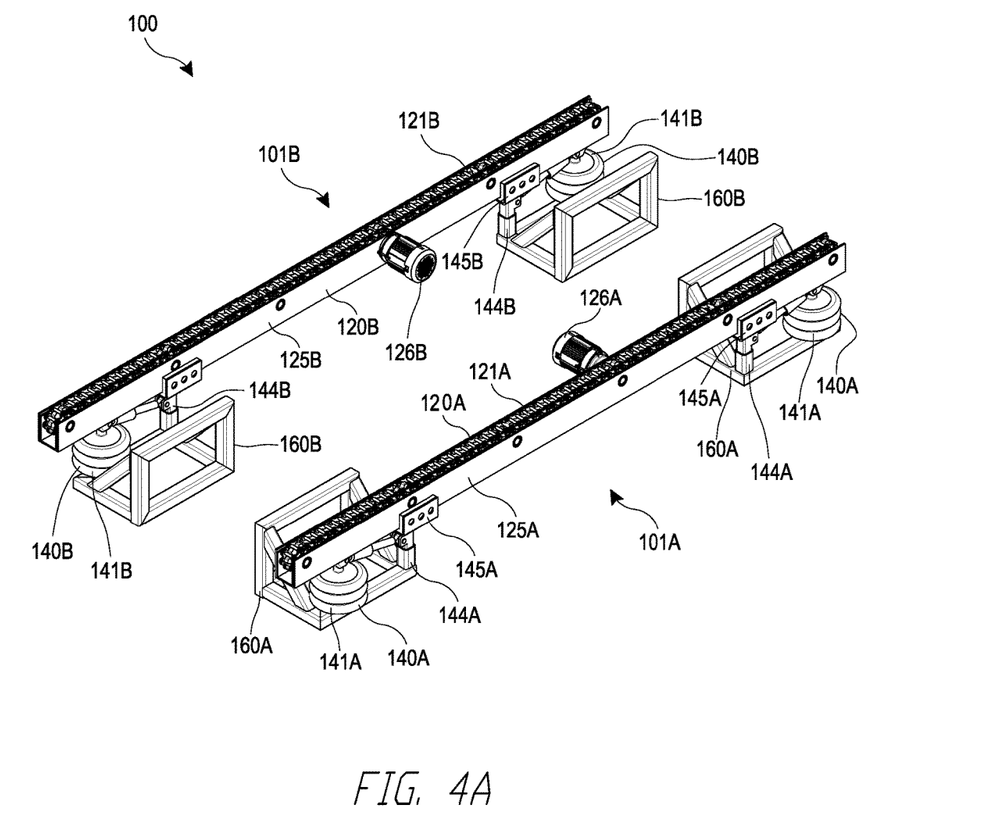
FIG. 4A is a perspective view of an embodiment of a container transfer system.

FIG. 4A is a perspective view of an embodiment of a container transfer system 100. Although shown alone in FIG. 4A, the container transfer system 100 is configured to be mounted to the frame of a truck, trailer, other transport vehicle, or rack as described below (see FIGS. 6A-6B, for example). In the illustrated embodiment, the container transfer system 100 includes two separate assemblies 101a, 101b. As will become apparent from the following description, each assembly 101a, 101b is configured to (1) convey a container backwards or forwards along its length (referred to herein as the horizontal direction) and (2) move up and down vertically.

In the illustrated embodiment, each assembly 101a, 101b includes one conveyance mechanism 120a, 120b. As will be described below, the conveyance mechanism 120a, 120b is configured to convey a container backwards and forwards in the horizontal direction.

Each assembly 101a, 101b also desirably includes two lift mechanisms 140a, 140b. For each assembly 101a, 101b, the two lift mechanisms 140a, 140b support the conveyance mechanism 120a, 120b. In the illustrated embodiment, for each assembly 101a, 101b, a first lift mechanism 140a, 140b is positioned at substantially a first end of the conveyance mechanism 120a, 120b, and a second lift mechanism 140a, 140b is positioned substantially at a second end of the conveyance mechanism 120a, 120b. Although the lift mechanisms 140a, 140b are shown positioned substantially at the ends of the conveyance mechanisms 120a, 120b, this need not be the case in all embodiments. For example, in some embodiments, the lift mechanisms 140a, 140b can be positioned spaced inward from the ends of the conveyance mechanisms 120a, 120b. In some embodiments, for each assembly 101a, 101b, the lift mechanism 140a, 140b are substantially similar to each other. In some embodiments, the lift mechanisms 140a, 140b on one end of the conveyance mechanisms 120a, 120b can be arranged in a mirrored configuration to the lift mechanisms 140a, 140b on the opposite end of the conveyance mechanisms 120a, 120b. In some embodiments, each assembly 101a, 101b includes more than two (for example, three, four, five, or more) lift mechanisms 140a, 140b for each conveyance mechanism 120a, 120b.

As will be described below, the lift mechanisms 140a, 140b are configured to raise and lower the conveyance mechanisms 120a, 120b in the vertical direction, as well as adjust the angle of the conveyance mechanisms 120a, 120b relative to horizontal. In some embodiments, each lift mechanism 140a, 140b is independently controllable so as to allow for independent adjustment of the height of each conveyance mechanism 120a, 120b as well as independent adjustment of the angle of each.

While each lift mechanism desirably 140a, 140b supports an end of a conveyance mechanism 120a, 120b, each lift mechanism 140a, 140b is desirably supported by a mounting frame 160a, 160b. The mounting frames 160a, 160b are configured to be mounting points for installing each assembly 101a, 101b. For example, in some embodiments, the mounting frames 160a, 160b are configured to mount to the frame of a transport vehicle, a rail car, a cargo bay of a boat or airplane, a storage rack, etc. The mounting frames 160a, 160b provide a base for the container transfer system 100. The mounting frames 160a, 160b are configured to provide the structural strength required to carry the weight of the container transfer system as well as any container and load that can be placed thereon. The embodiments of the mounting frames 160a, 160b shown in the figures are provided by way of example only and, in some embodiments, can be varied to conform to the transport vehicle (or other object) to which the container transfer system 100 is to be mounted.

As shown in FIG. 4A, the assemblies 101a, 101b can be positioned in a substantially parallel arrangement. In some embodiments, the assemblies 101a, 101b are substantially mirror images of each other. That is, the assembly 101b can include substantially the same components as the assembly 101a, although in the reversed configuration. Thus, for ease of description, the following discussion of FIGS. 4B-4E will describe the components of the assembly 101a of the container transfer system 100, with the understanding that the assembly 101b includes similar features.

Figure 4B:
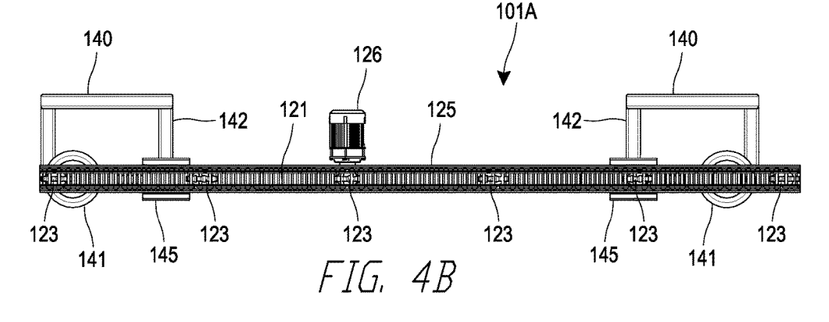
FIG. 4B is a top view of one side of the container transfer system of FIG. 4A.
Figure 4C:
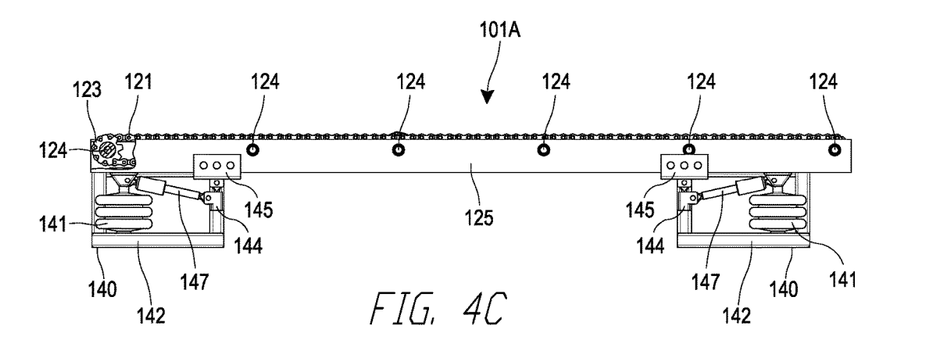
FIG. 4C is a side view of the one side of the container transfer system of FIG. 4B.
Figure 4D:
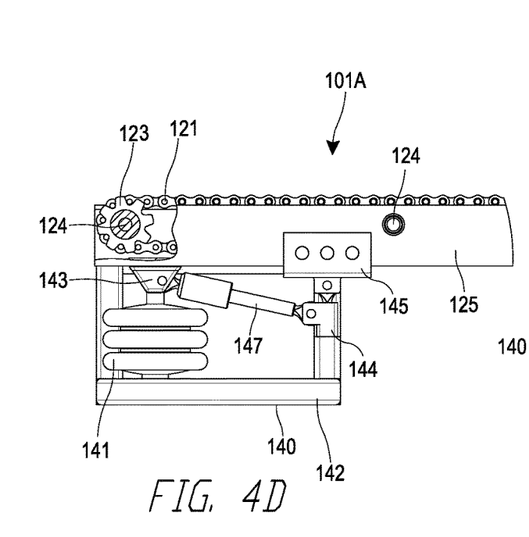
FIG. 4D is a detail side view of an end portion of the one side of the container transfer system of FIG. 4B.
Figure 4E:
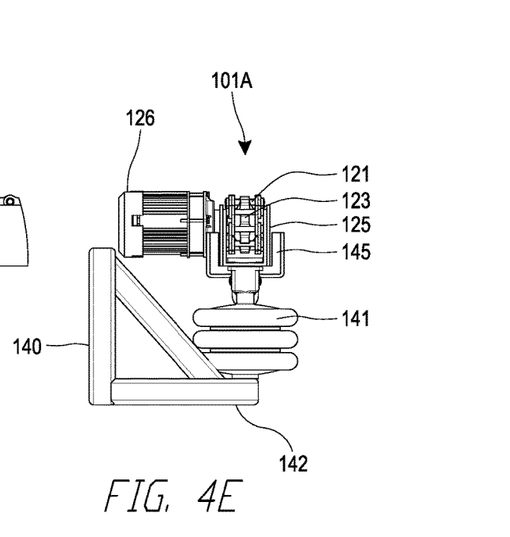
FIG. 4E is a front view of the one side of the container transfer system of FIG. 4B.

FIG. 4B is a top view of the assembly 101a, and FIG. 4C is a side view of the assembly 101a. FIG. 4D is a detail side view of an end portion the assembly 101a, and FIG. 4E is a front view of the assembly 101a. For simplicity, the components of the assembly 101a numbered in FIGS. 4B-4E do not include reference characters "a" and "b," which have been used previously herein (for example, in FIG. 4A) to refer to the components of the assemblies 101a, 101b, respectively.

As shown in FIGS. 4A-4E, the assembly 101a includes the conveyance mechanism 120. In the illustrated embodiment, the conveyance mechanism 120 includes a conveyor chain 121. The conveyor chain 121 may be formed as a continuous loop of chain mounted on sprockets 123. The sprockets 123 are partially seen in FIGS. 4B and 4D, and one of the sprockets 123 is visible in the cutaway portion of FIGS. 4C and 4D. In the illustrated embodiment, the assembly 101a includes six sprockets 123, although other numbers of sprockets 123 possible. One sprocket 123 is positioned at each end of the conveyance mechanism 120 and the remaining sprockets 123 are spaced evenly between the two end sprockets 123. In some embodiments, the sprockets 123 are not evenly spaced. In some embodiment, a sprocket 123 is positioned every few feet along the length of the conveyance mechanism 120. For example, a sprocket 123 can be positioned every 3 feet, every 2.5 feet, every 2 feet, every 1.5 feet, every 1 foot, or every six inches along the conveyance mechanism 120, as well as at greater or smaller spacings or spacings in between the listed values.

The sprockets 123 are rotatably supported on axles 124 that are mounted to a drive tray 125. In some embodiments, the drive tray 125 comprises a U-shape or a squared U-shape channel. In some embodiments, the sprockets 123 and are positioned substantially within the channel of the drive tray 125. In some embodiments, a top portion of the sprockets 123 extends about the drive tray 125, such that the top run of the conveyor chain 121 is positioned above the drive tray 123. The lower run of the conveyor chain 121 may be positioned within the drive tray 125.

A motor 126 is attached to one of the axles 124 and configured to drive on of the sprockets 123. The motor 126 drives one of the sprockets 123, which in turn, advances the conveyor chain 121. The motor 126 may be configured to operate in both directions (in other words, clockwise and counterclockwise) such that the conveyor chain 121 can be moved in both forward and backward directions. As will be described with reference to FIGS. 5A and 5B, a container can include engagement features that engage the conveyor chain 121, such that a container resting on the conveyor chain 121 moves with the conveyor chain 121. Thus, the conveyance mechanism 120 is configured to convey a container back and forth in a horizontal direction along the length of the conveyance mechanism 120.

In the illustrated embodiment, the motor 126 is connected to one of the middle axles 126, although this need not be the case in all embodiments. In the illustrated embodiment, the motor 126 is positioned on the inside of the assembly 101a (see FIG. 4A); again, this need not be the case in all embodiments. In some embodiments, the motor 126 is an electric motor. The motor 126 can be powered by the electrical system of the transport vehicle to which the container transfer system 100 is attached. Alternatively, the motor 126 can be separately powered, for example, by batteries or an external power source. The motor 126 can be connected to a user interface that allows an operator to control the motor 126. Although only a single motor 126 is illustrated from the assembly 101a, in some embodiments, more than one motor 126 can be included.

As shown in FIG. 4A, each assembly 101a, 101b includes its own motor 126a, 126b. In some embodiments, the motors 126a, 126b are synchronized such that the conveyor chains 121a, 121b are driven together, at the same speed, and in the same direction. In some embodiments, each motor 126a, 126b can be independently controlled. In some embodiments, a single motor 126 is connected via one or more drive shafts to a sprocket 123 on each of the assemblies 101a, 101b such that a single motor 126 drives the conveyor chains 121a, 121b of the assemblies 101a, 101b.

The conveyance mechanism 120 shown in the figures and described herein is provided by way of example only. In other embodiments, other types of systems can be used. For example, in some embodiments, a rotating acme or lead screw can replace the sprockets and conveyor chain in order to produce linear motion. In other embodiments, the conveyor chain can be replaced by a belt.

As noted previously, the conveyance mechanism 120 is supported by two lift mechanisms 140 and the lift mechanisms 140 are configured to raise and lower the conveyance mechanism 120 in the vertical direction. In the illustrated embodiment, each lift mechanism 140 includes an air spring 141. As illustrated, the air springs 141 are mounted substantially below each end of the conveyance mechanism 121. In some embodiments, the air springs 141 are coupled to the drive tray 125 with a tongued bracket 143 mounted in a groove of the drive tray 125 in a tongue-in-groove configuration (see cutaway portion of FIG. 4D). In some embodiment, the tongue and groove can be reversed: the groove can be included on the bracket 143 and the tongue on the drive tray 125. The tongue-in-groove configuration can be configured to allow some relative horizontal motion between the drive tray 125 and the air spring 141, while constraining their vertical motion together. In some embodiments, the bracket 143 is rigidly attached to the drive tray 125.

The air spring 141 can be pneumatically connected to a compressor (not shown) configured to supply pressurized air to the air spring 141. By adding air to the air spring 141 the height of the air spring 141 can be increased. As the height of the air spring 141 is increased, the conveyance mechanism 120 is raised vertically. Conversely, removing air from the air spring 141 (for example, by bleeding through a valve (not shown)) the height of the air spring 141 can be reduced, lowering the conveyance mechanism 120. In some embodiments, hydraulic elements can be used in place of (or in addition to) pneumatic elements.

Many transport vehicles onto which the container transfer system 100 can be installed include suitable compressed air systems for supplying air to the air springs 141. For example, a tractor having an air-ride suspension system is already equipped with suitable compressor technology to accommodate the lift mechanism 140. In some embodiments, a separate compressor or other source of pressurized air can be provided to provide air to the air springs 141.

Figure 8:
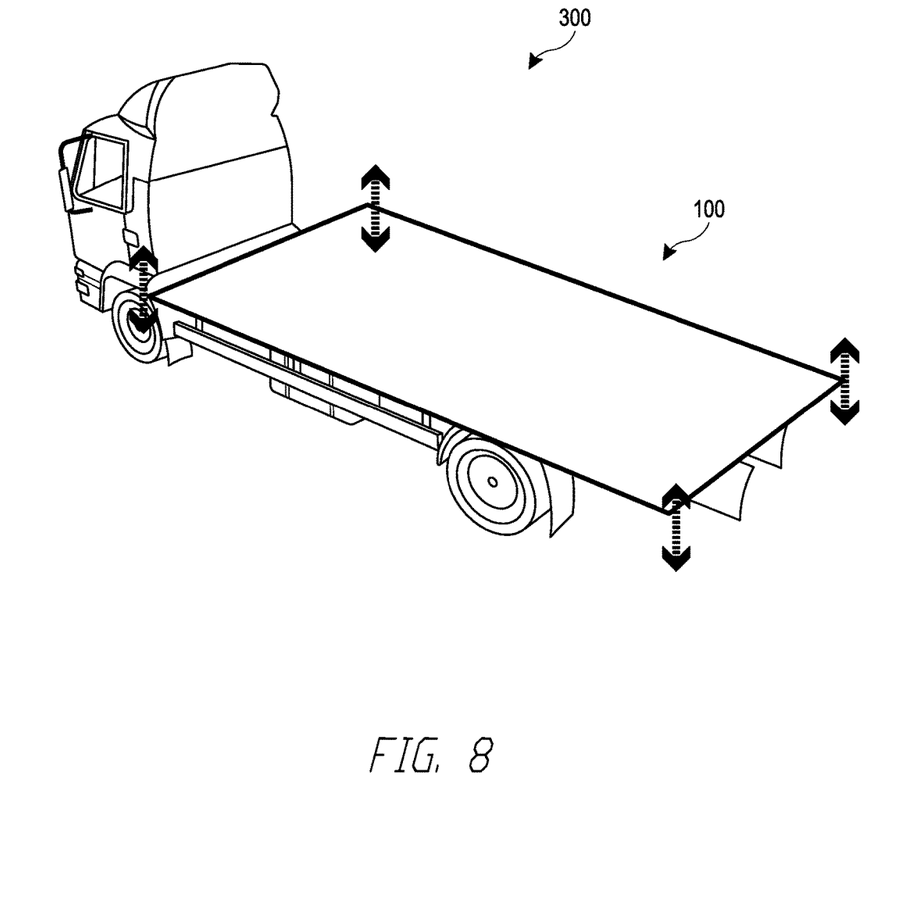
FIG. 8 is a perspective view illustrating an embodiment of a transport vehicle including a container transfer system that can be adjusted so as to be level.

In some embodiments, the air spring 141 of each lift mechanism 140 is individually adjustable. By adjusting the height of each air spring 141 on the four corners of the container transfer system 100, the height and angle of each conveyance mechanism 120 can be independently controlled an adjusted. In some embodiments, this can allow a load (for example, a container) to be tilted, raised, or lowered in any direction, and allow two container transfer systems 100 to be aligned as shown in FIG. 8.

Although an air spring 141 is shown in the figures and described herein, other mechanisms (for example, hydraulic rams) can be used in some embodiments. The air springs 141 can be controlled by a user interface that allows an operator to adjust the height of the lift mechanisms 140.

In the illustrated embodiment, each lift mechanism 140 also includes a telescoping strut 144. The telescoping strut 144 is configured such that its length is adjustable to adapt to the height of the air spring 141 and the conveyance mechanism 120. The telescoping strut 144 is biased toward an extended configuration. The telescoping strut 144 is connected at its upper end a stabilizer slide 145. The stabilizer slide 145 is configured to slidingly engage with the drive tray 125 of the conveyance mechanism 120. In some embodiments, the stabilizer slide 145 comprises a U-shaped bracket and the drive tray 125 is slidingly nested in the stabilizer slide 145. In some embodiments, the stabilizer slide 145 includes replaceable glide pads. In some embodiments, the glide pads may comprise Teflon. In some embodiments, the glide pads may include bearings or rollers. In some embodiments, the replaceable glide pads are positioned between the stabilizer slide 145 and the drive tray 125 to provide a smooth bearing surface at the junction between the drive tray 125 and the stabilizer slides 145. Thus, the upper end of telescoping strut 144 is slidingly engaged with the drive tray 125 in order to adapt to changes in the height of the air spring 141 and provide additional support for the conveyance mechanism 120. In some embodiments, the sliding engagement between the stabilizer slide 145 and the drive tray 125 allows the lift mechanism to account for varying angles of the conveyance mechanism 120 (for example, where one end of the conveyance mechanism 120 is lifted higher than the other). In some embodiments, the telescoping strut 144 is rigidly attached to the drive tray 125.

In the illustrated embodiment, each lift mechanism 140 includes a telescoping stabilizer bar 147. In some embodiments, the stabilizer bar 147 comprises a pivoting tie rod that diagonally connects the bracket 143 of the air spring 141 to the telescoping strut 144. In some embodiments, the stabilizer bar 147 provides additional support to the load and further couples the motion of the air spring 141 to that of the telescoping strut 144 and stabilizer slide 145. In some embodiments, the telescoping stabilizer bar 147 further accommodates for uneven independent adjustment of the air springs 141.

Each lift mechanism 140 is attached to a mounting frame 142. In some embodiments, each mounting frame 142 comprises a rigid support frame, for example, made from welded square or round tubing. In the illustrated embodiment, each mounting frame 142 is shaped as a right triangular prism, although other shapes are possible. As noted previously, the shape of the mounting frame 142 can be varied to fit the application of the container transfer system 100.

The chain drives 121 of the container transfer system 100 are configured to interface with containers, such that the container transfer system 100 can convey containers back and forth in a horizontal direction without requiring the use of external machinery, such as forklifts, cranes, hoists, etc. The height of the container transfer system 100 can be adjusted by the lift mechanisms 140 in order to match the height of another container transfer system 100 to which the container can be conveyed as shown in FIG. 3.

Figure 5A:
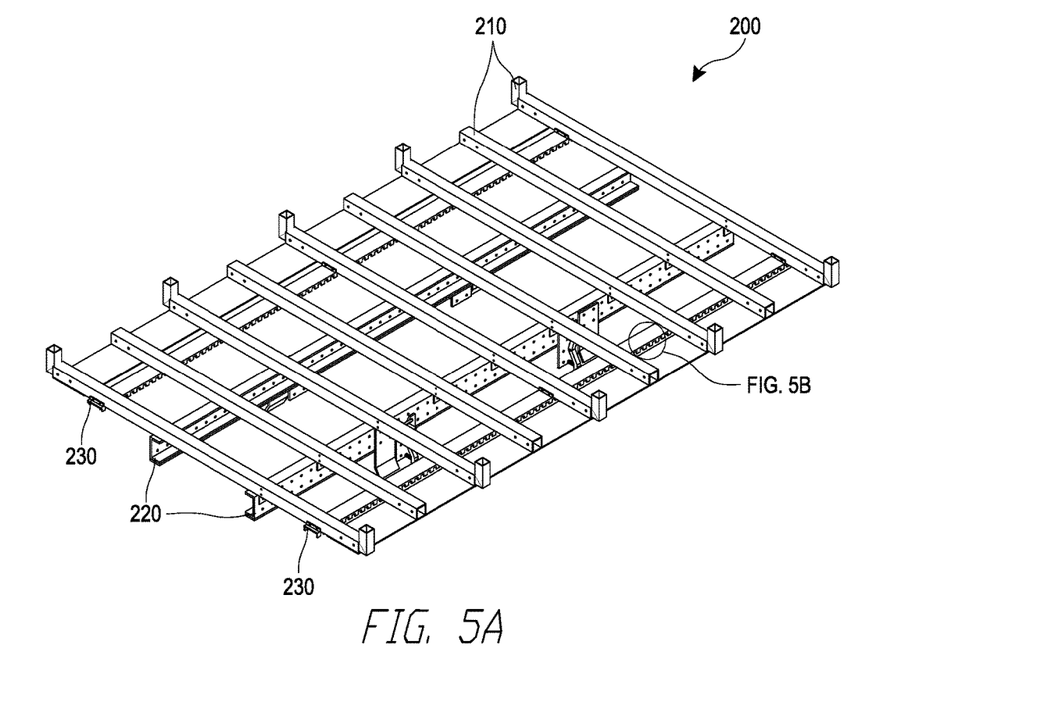
FIG. 5A is a perspective view of a base of a container.

FIG. 5A is a perspective view of a base 200 for a container that can be used with the container transfer systems 100 described herein. The base 200 is configured to support the container. Although not shown, in some embodiments, the container is a rectangular enclosure, although other shapes are possible. As noted previously, in some embodiments, the container is fully enclosed and lockable, while, in other embodiments, the container remains open (for example, having an open top, sides, and/or end). In some embodiments, a flat platform may be mounted on the base 200 to form a flatbed.

As shown in FIG. 5A, the base 200 can comprise a frame of transverse supports 210 supported by longitudinal supports 220. In the illustrated embodiment, the transverse supports comprise square tubing, although other configurations are possible. In the illustrated embodiment, the longitudinal supports 220 comprise channel beams, although, again, other configurations are possible. The number and arrangement of transverse supports 210 and longitudinal supports 220 can be varied from the example embodiment shown in FIG. 5.

Figure 5B:
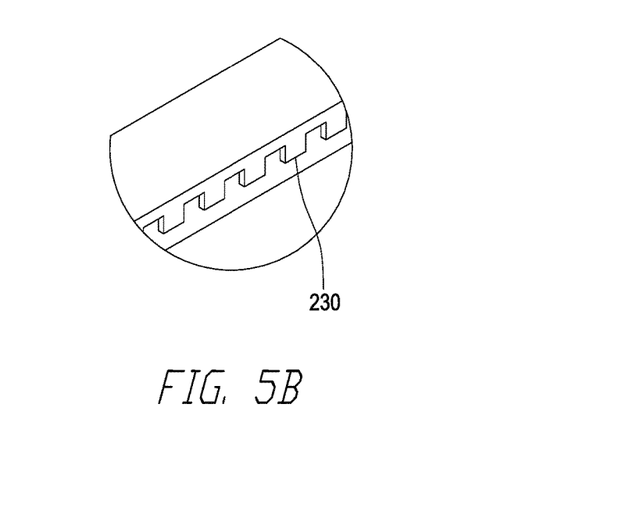
FIG. 5B is a detail perspective view of an engagement structure on the base of FIG. 5A.

As also shown in FIG. 5A, and in the detail view of FIG. 5B, the base 200 also includes engagement structures 230. In the illustrated embodiment, the engagement structures 230 are drive trains that extend longitudinally along the bottom of the base 200. The two engagement structures 230 are spaced apart in a configuration that matches that of the two assemblies 101a, 101b of the container transfer system 100 of FIG. 4A. Thus, when the base 200 is placed on the container transfer system 100, the two engagement structures 230 rest on the conveyance mechanism 120a, 120b. In the illustrated embodiment, the engagement structures 230 include a toothed configuration as shown in FIG. 5B. The toothed configuration is configured to engage the conveyor chains 121a, 121b. Thus, motion of the conveyor chains 121a, 121b is imparted to the base 200. In some embodiments, the engagement structures 230 may comprise other forms that correspond to features on the conveyance mechanisms 120a, 120b.

In some embodiments, the base 200 is made from modular components such that the size and configuration of the base 200 can be modified and adjusted to match the size and shape of a particular container with which it will be used.

Figure 6A:
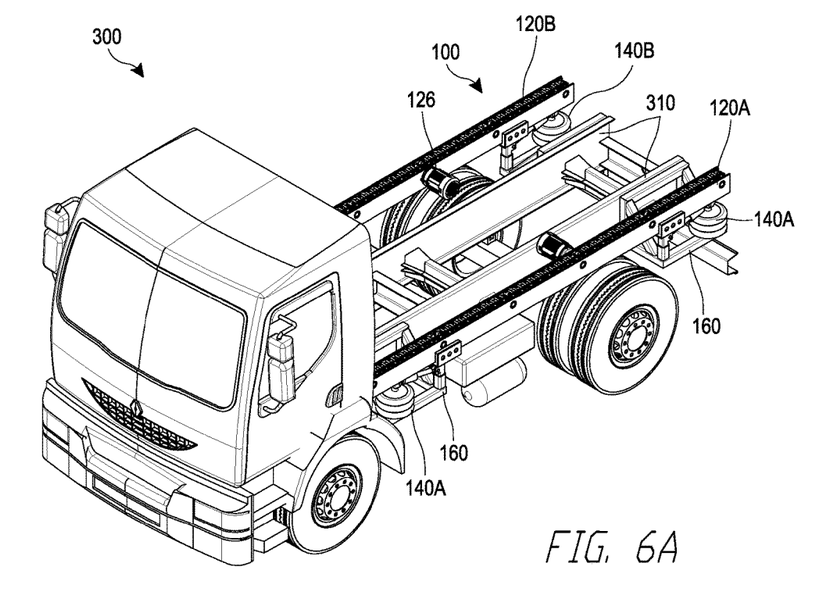
FIG. 6A is a perspective view of a transport vehicle including the container transfer system of FIG. 4A.
Figure 6B:
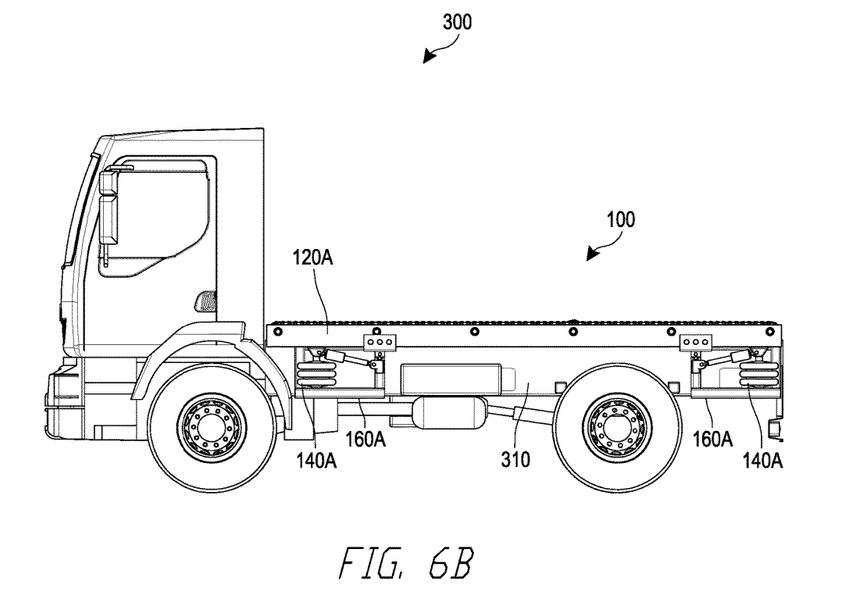
FIG. 6B is a side view of the transport vehicle of FIG. 6A.

FIG. 6A is a perspective view of a transport vehicle 300 including the container transfer system 100 of FIG. 4A. FIG. 6B is a side view of the transport vehicle 300 of FIG. 6A. In the illustrated embodiment, the transport vehicle 300 is a delivery truck and is configured to receive one container thereon (for example, similar to the second transport vehicle 52 shown in FIG. 3). The mounting frames 142 are mounted to frame members 310 of the transport vehicle 300. As will be described below with reference to FIGS. 7A-7D, in some embodiments, when the container transfer system 100 is conveying a container, the base 200 of the container is lifted above (not-contacting) the frame members 310 of the transport vehicle 300. In some embodiments, once the container is positioned on the container transfer system 100, the lift mechanisms 140 can lower the container so that it rests on the frame members 310. In some embodiments, the longitudinal supports 220 of the base 200 rest on the frame members 310 of the transport vehicle 300. In some embodiments, the container can then be locked to the frame members 310 to ensure stability during transport.

Figure 7A:
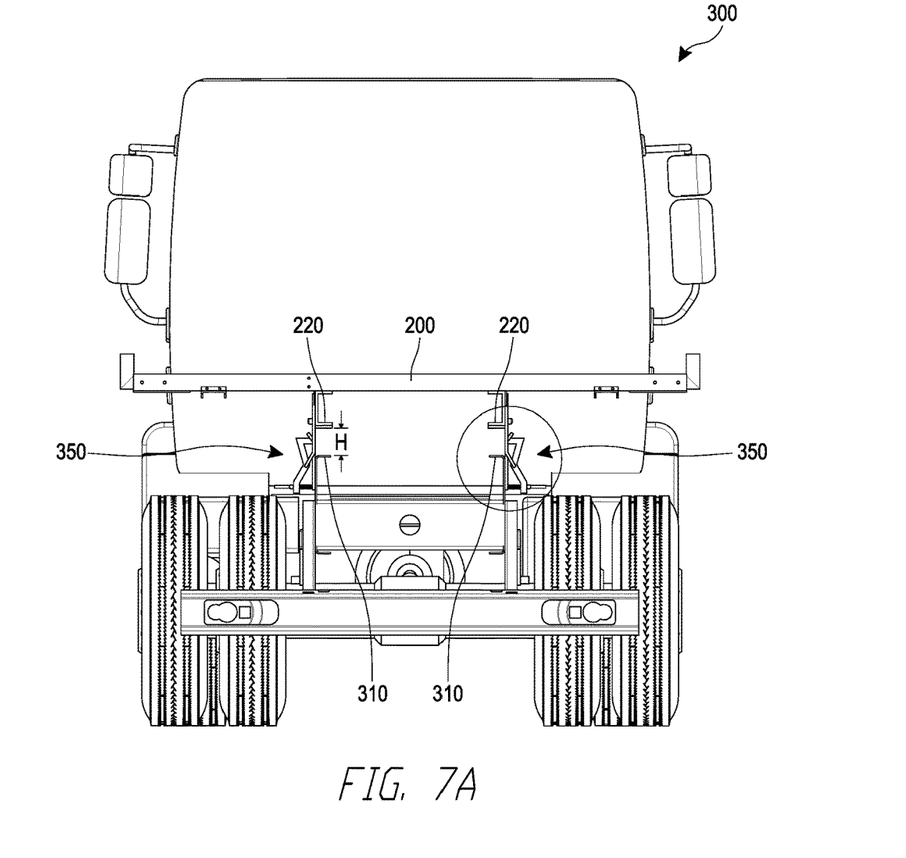
FIG. 7A is a rear view of a transport vehicle and illustrates a locking mechanism for locking a container to the transport vehicle in an unlocked state.
Figure 7B:
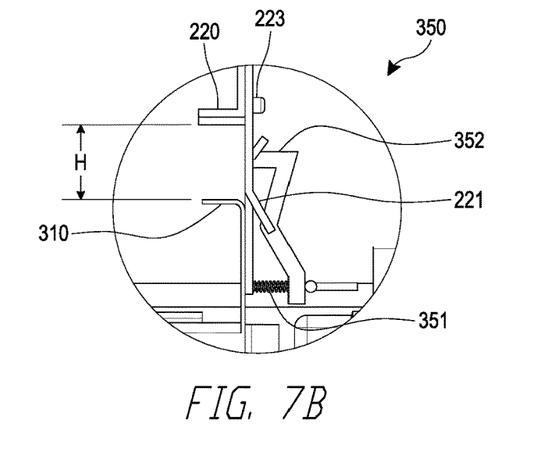
FIG. 7B is a detail view of the locking mechanism of FIG. 7A in an unlocked state.
Figure 7C:
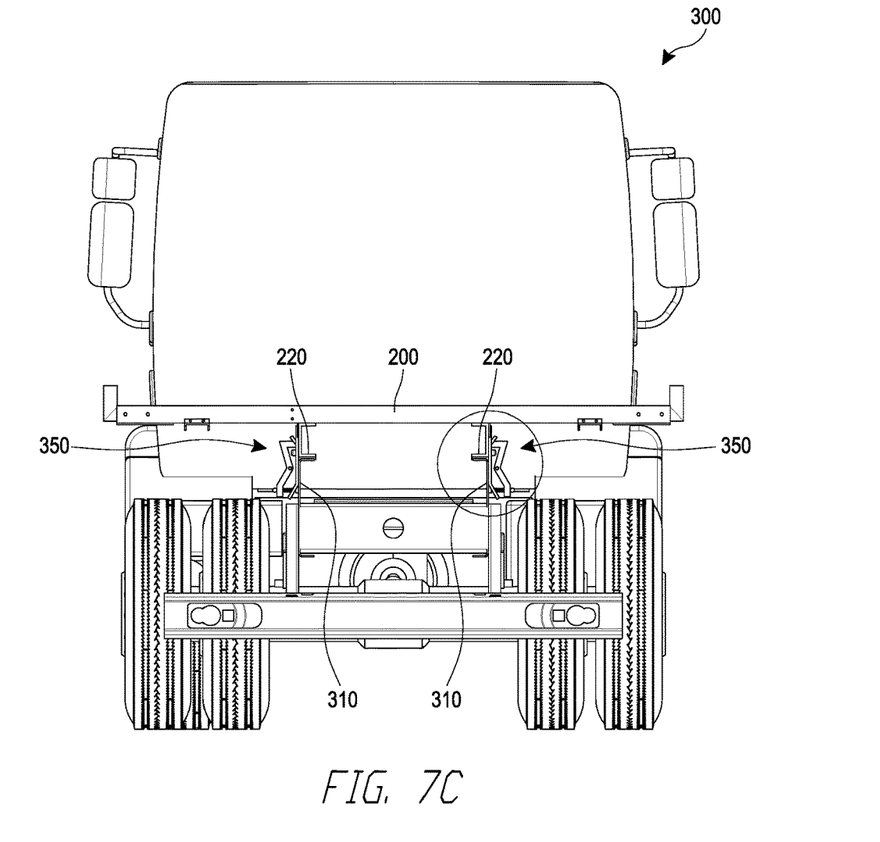
FIG. 7C is a rear view of the transport vehicle and locking mechanism of FIG. 7A, illustrated in a locked state.
Figure 7D:
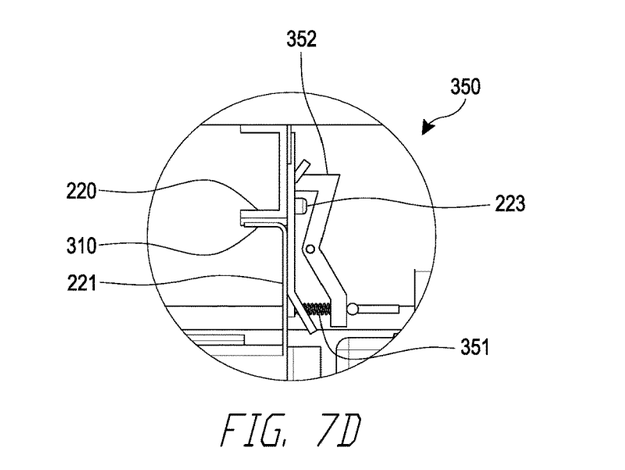
FIG. 7D is a detail view of the locking mechanism of FIG. 7C in a locked state.

FIGS. 7A and 7C are rear views of the transport vehicle 300 and illustrate a locking mechanism 350 for locking the base 200 to the transport vehicle 300 in unlocked state and locked states, respectively. In FIGS. 7A and 7C, the container transfer system 100 is omitted for clarity. FIGS. 7B and 7D are detail views of the locking mechanism 350 in unlocked and locked states, respectively.

As illustrated in FIG. 7A, the base 200 is lifted by the lift mechanisms 140 of the container transfer system 100 such that the longitudinal supports 220 are positioned a distance H above the frame members 310 of the vehicle 300. In some embodiments, the container transfer system 100 can position the base 200 in this position when the container is being conveyed back and forth. In this position, the weight of the container is supported by the container transfer system 100. Further, in this position, in some embodiments, the container is not locked to the vehicle 300. As shown in FIG. 7B, a locking pin 351 of the locking system 300 is not engaged with the longitudinal support 220 of the base 200.

FIGS. 7C and 7D illustrate an example of the locked configuration. As shown, the base 200 has been lowered such that that longitudinal supports 220 rest on the frame members 310. In some embodiments, the container transfer system 100 may place the container in this position during transport. In some embodiments, at least a portion of the weight of the container is supported on the frame members 310 of the vehicle 300 in this position. In some embodiments, the longitudinal supports 220 of the base 200 include angled guide members 221 that extend downwardly to guide the longitudinal supports 220 onto the frame members 310 as the container transfer system 100 lowers the container. As shown in FIG. 7D, once lowered, the locking pin 351 engages with the longitudinal supports 220 of the base 200 to lock the base into position on the frame members 310. In some embodiments, the locking pin 351 includes a portion that extends through an opening in the angled guide members 221. In some embodiments, the locking pin 351 includes a portion 352 that locks over a projection 223 on the longitudinal supports 220. In some embodiments, other methods for securing the container to the transport vehicle 300 are possible.

FIG. 8 is a perspective view illustrating an embodiment of a transport vehicle 300 including a container transfer system 100 and illustrates that each corner of the container transfer system 100 can be independently adjusted. As previously described, a lift mechanism 140 can be included in each corner of the container transfer system 100. This allows each corner to be raised or lowered individually. This control can allow the transfer system 100 to be aligned with another container transfer system 100 of another transport vehicle 300 regardless of uneven ground condition or a height difference between the two vehicles. This control can also allow a container placed on the container transfer system 100 to be leveled.

Figure 9:
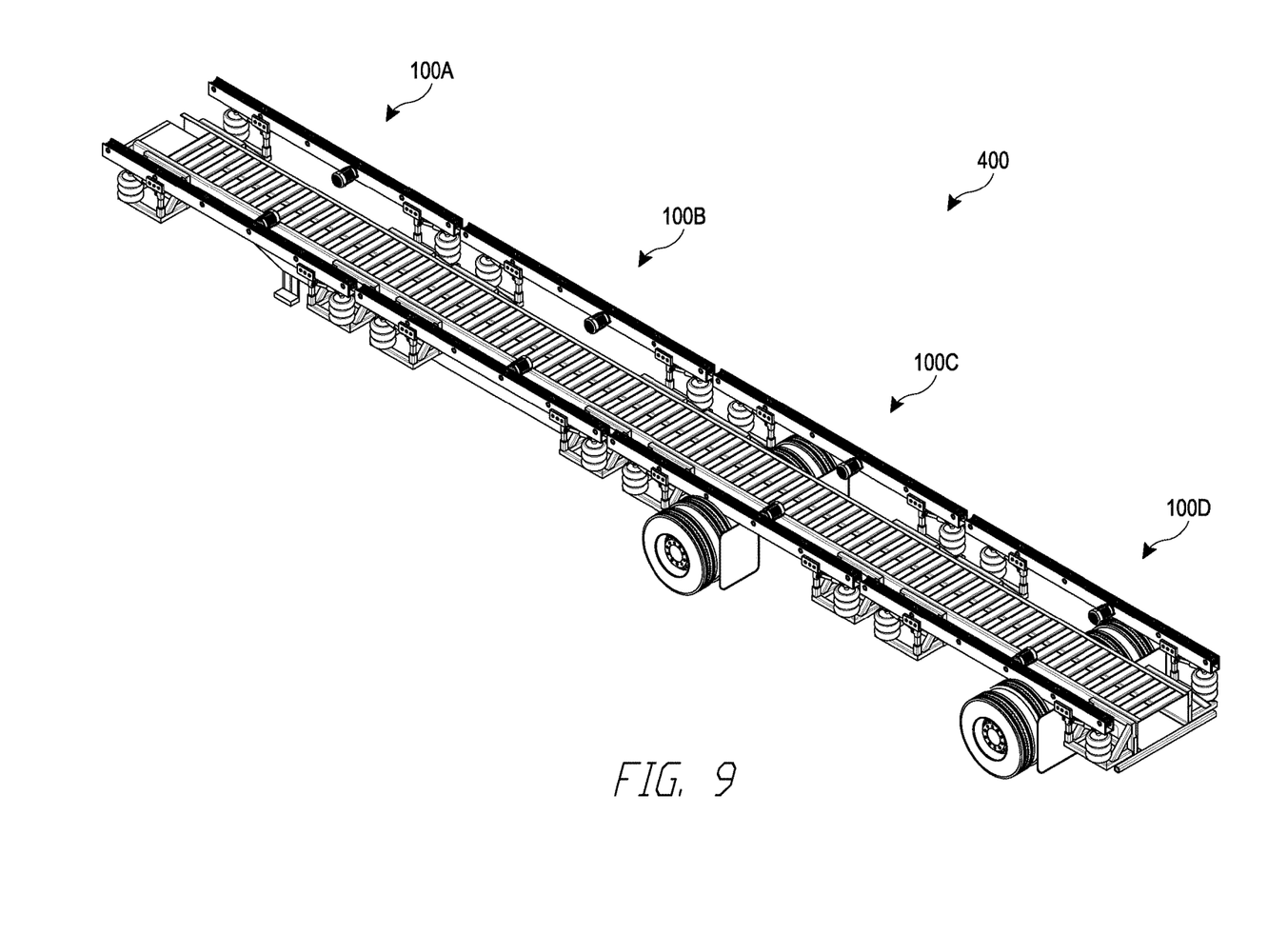
FIG. 9 illustrates an embodiment of a semi-trailer including four container transfer systems.

FIG. 9 illustrates an embodiment of a semi-trailer 400 including four container transfer systems 100a-100d. In some embodiments, this configuration allows the semi-trailer 400 to hold four containers (for example, similar to the transport vehicle 51 of FIG. 3). In some embodiments, the container transfer systems 100a-100d are independently operable. In some embodiments, the container transfer systems 100a-100d operate together. In some embodiments, the semi-trailer 400 can include other numbers of container transfer systems, for example, one, two, three, five, six or more.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures can be combined, interchanged or excluded from other embodiments.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties can be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A container transfer system, comprising:
   a conveyance mechanism configured to support a container and move the container along a first axis, the conveyance mechanism comprising
      a drive tray including a channel,
      a plurality of sockets mounted to the drive tray and positioned within the channel,
      a conveyor chain mounted on the plurality of sockets, and
      an electric motor connected to one of the plurality of sockets and configured to drive the conveyor chain; and
   a lift mechanism configured to raise and lower the conveyance mechanism, the lift mechanism comprising
      a frame,
      an air spring attached at a first end to the frame and at a second end to the drive tray, wherein a height of the air spring can be adjusted to vary a distance between the frame and the conveyance mechanism,
      a telescoping strut attached at a first end to the frame, and
      a stabilizer slide attached to a second end of the telescoping strut, the stabilizer slide including a channel, wherein the drive tray is received within the channel of the stabilizer slide.

2. The container transfer system of claim 1, wherein a glide pad is positioned within the channel of the stabilizer slide between the stabilizer slide and the drive tray.

3. The container transfer system of claim 1, wherein the drive tray is configured to slide along the channel of the stabilizer slide.

4. The container transfer system of claim 1, wherein the lift mechanism further comprises a stabilizer bar extending between the second end of the air spring and the second end of the telescoping strut.

5. The container transfer system of claim 4, wherein the stabilizer bar is configured to telescope such that a length of the stabilizer bar is adjustable.

6. The container transfer system of claim 1, wherein the frame is configured to mount to a vehicle.

7. The container transfer system of claim 1, wherein the lift mechanism is a first lift mechanism attached to a first end of the conveyance mechanism, and a second lift mechanism is attached to a second end of the conveyance mechanism.

8. The container transfer system of claim 7, wherein each of the first and second lift mechanisms is independently adjustable such that an angle of the conveyance mechanism can be adjusted.

9. The container transfer system of claim 1, wherein the container includes an engagement structure for engaging the conveyance mechanism.

10. A vehicle comprising one or more of the container transfer systems of claim 1.

11. A method for transferring a container between a first vehicle and a second vehicle or the first vehicle and a rack, the method comprising:
    longitudinally aligning a first conveyance mechanism of a first container transfer system of the first vehicle with a second conveyance mechanism of a second container transfer system of the second vehicle or the rack, wherein the first conveyance mechanism comprises a drive tray including a channel, a plurality of sockets mounted to the drive tray and positioned within the channel, a conveyor chain mounted on the plurality of sockets, and an electric motor connected to one of the plurality of sockets and configured to drive the conveyor chain;
    vertically aligning the first conveyance mechanism of the first container transfer system of the first vehicle with the second conveyance mechanism of the second container transfer system of the second vehicle or the rack by adjusting a lift mechanism of the first container transfer system of the first vehicle and/or a lift mechanism of the container transfer system of the second vehicle or the rack, wherein the lift mechanism comprises a frame, an air spring attached at a first end to the frame and at a second end to the drive tray, wherein a height of the air spring can be adjusted to vary a distance between the frame and the conveyance mechanism, a telescoping strut attached at a first end to the frame, and a stabilizer slide attached to a second end of the telescoping strut, the stabilizer slide including a channel, wherein the drive tray is received within the channel of the stabilizer slide; and transferring a container from the first container transfer system of the first vehicle to the second container transfer system of the second vehicle or the rack with the first conveyance mechanism of the first container transfer system of the first vehicle and/or the second container transfer system of the second vehicle or the rack.

12. The method of claim 11, wherein said longitudinally aligning comprises backing the first vehicle to the second vehicle or the rack such that the conveyance mechanisms are aligned.

13. The method of claim 11, wherein said vertically aligning comprises adjusting a height of an air spring of the first lift mechanism of the first container transfer system.

14. The method of claim 11, wherein said transferring comprises driving a conveyor chain of the first conveyance mechanism of the first vehicle.

* * * * *